US009537167B2

(12) United States Patent
Jiang et al.

(10) Patent No.: US 9,537,167 B2
(45) Date of Patent: Jan. 3, 2017

(54) METHODS AND APPARATUS OF AN ANODE/CATHODE (A/C) JUNCTION FUEL CELL WITH SOLID ELECTROLYTE

(71) Applicant: U.S. Army Research Laboratory ATTN: RDRL-LOC-I, Adelphi, MD (US)

(72) Inventors: Rongzhong Jiang, Olney, MD (US); Dat Tien Tran, Perry Hall, MD (US); Deryn D. Chu, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 72 days.

(21) Appl. No.: 14/162,223

(22) Filed: Jan. 23, 2014

(65) Prior Publication Data
US 2015/0207163 A1 Jul. 23, 2015

(51) Int. Cl.
*H01M 8/10* (2016.01)
*H01M 8/06* (2016.01)
(Continued)

(52) U.S. Cl.
CPC ........... *H01M 8/1002* (2013.01); *H01M 4/921* (2013.01); *H01M 8/0206* (2013.01); *H01M 8/0232* (2013.01); *H01M 8/0245* (2013.01); *H01M 8/0612* (2013.01); *H01M 8/0656* (2013.01); *H01M 8/1007* (2016.02); *H01M 8/1011* (2013.01); *H01M 2008/1095* (2013.01); *Y02E 60/522* (2013.01); *Y02E 60/523* (2013.01)

(58) Field of Classification Search
CPC H01M 8/1011; H01M 8/1002; H01M 8/0656; H01M 8/0612; H01M 8/0206; H01M 8/0232; H01M 8/0245; H01M 4/921; H01M 2008/1095; Y02E 60/522; Y02E 60/523
See application file for complete search history.

(56) References Cited

U.S. PATENT DOCUMENTS 6,596,422 B2   7/2003  Ren
6,605,381 B1 * 8/2003  Rosenmayer ....... H01M 8/0234
                                                     29/623.1
(Continued)

OTHER PUBLICATIONS

The Fuel Cell Today Industry Review 2012, pp. 1-54 (Source: Fuel Cell Today).
(Continued)

*Primary Examiner* — Milton I Cano
*Assistant Examiner* — Stephen Yanchuk
(74) *Attorney, Agent, or Firm* — Robert Thompson (57) ABSTRACT

The present invention relates to a fuel cell having an anode; a cathode opposing the anode; a first electrolyte membrane disposed between the anode and the cathode; a second electrolyte membrane disposed between the anode and the cathode; and an A/C junction electrode disposed between the first electrolyte membrane and the second electrolyte membrane, the A/C junction electrode comprising a first gas diffusion layer; a second gas diffusion layer; a current collector disposed between the first gas diffusion layer and the second gas diffusion layer; a first catalyst layer disposed between the first electrolyte membrane and the first gas diffusion layer; and a second catalyst layer disposed between the second electrolyte membrane and the second gas diffusion layer.

19 Claims, 10 Drawing Sheets

(51) Int. Cl.
*H01M 4/92* (2006.01)
*H01M 8/02* (2016.01)

(56) References Cited

U.S. PATENT DOCUMENTS

| | | | |
|---|---|---|---|
| 6,890,419 B2 | 5/2005 | Reichman et al. | |
| 7,960,070 B2 | 6/2011 | Uchida et al. | |
| 2002/0192537 A1* | 12/2002 | Ren | H01M 4/8605 429/415 |
| 2004/0096710 A1* | 5/2004 | Faita | H01M 8/04089 429/418 |
| 2008/0008918 A1* | 1/2008 | Kim | H01B 1/122 429/494 |
| 2009/0214911 A1 | 8/2009 | Ohashi et al. | |
| 2009/0220845 A1* | 9/2009 | Mittelsteadt | C25B 9/10 429/518 |
| 2011/0223512 A1* | 9/2011 | Brune | H01M 8/0202 429/457 |

OTHER PUBLICATIONS

Technical Insights—High-Tech Materials Alert, pp. 1-9 (Jul. 8, 2011—Forest & Sullivan).

\* cited by examiner

METHODS AND APPARATUS OF AN ANODE/CATHODE (A/C) JUNCTION FUEL CELL WITH SOLID ELECTROLYTE

GOVERNMENT INTEREST

Governmental Interest—The invention described herein may be manufactured, used and licensed by or for the U.S. Government.

FIELD OF INVENTION

Embodiments of the present invention generally relate to an electrochemical device and, more particularly, to a fuel cell for generating hydrogen gas, electrical power, and mediation of electrochemical reactions and reactant transport.

BACKGROUND OF THE INVENTION

A fuel cell is an electrochemical device for directly converting chemical energy to electricity with higher efficiency than that of mechanical generators. A rapidly expanding need for electric power sources has stimulated the worldwide research and development of fuel cells for transportation, portable computer, cellular phone and various electronic devices. Typically, a fuel cell is assembled using a 2-electrode configuration. The cathode, or positive electrode, is coated with a catalyst for oxygen reduction. The anode is coated with a catalyst for fuel oxidation. An electrolyte, between the cathode and the anode, provides ionic conductivity for ion transport, and induces the electrochemical reactions at the electrode/electrolyte interface.

A fuel cell generally uses liquid or gaseous fuel, such as alcohol or hydrogen. In a hydrogen fuel cell, the electrode reactions is:

At the anode, $$2H_2 \rightarrow 4H^+ + 4e^- \; E^0 = 0.0V \quad (1)$$

At the cathode, $$O_2 + 4H^+ + 4e^- \rightarrow 2H_2O \; E_0 = 1.23V \quad (2)$$

The overall reaction is, $$2H_2 + O_2 \rightarrow 2H_2O \; E^0_{cell} = 1.23V \quad (3)$$

An electro-oxidized molecule of hydrogen generates two protons and two electrons. Meanwhile, a molecule of oxygen is electro-reduced by receiving four electrons. The electro-reduced molecule of oxygen combines with 4 protons to form two molecules of water. The theoretical cell voltage of such a fuel cell is 1.23 V. However, because of slow kinetic rate and high over potential for oxygen electro-reduction, the actual cell voltage is only 1.0 V in open circuit, and 0.75 V in operational status.

In an alcohol fuel cell, such as a direct methanol fuel cell, the electrode reaction is:

At the anode, $$CH_3OH + H_2O = CO_2 + 6H^+ + 6e^- \; E_0 = 0.02V \quad (4)$$

The overall reaction of a methanol fuel cell is, $$CH_3OH + \frac{3}{2}O_2 = CO_2 + 2H_2O \; E^0_{cell} = 1.21 \; V \quad (5)$$

An electro-oxidized molecule of methanol generates one molecule of carbon dioxide, six protons and six electrons.

The theoretical voltage for a methanol/oxygen fuel cell is 1.21V. However, due to very slow kinetics and high over potential of methanol electro-oxidation, such a fuel cell has only 0.7 V for open circuit voltage and 0.4 V in operational status. Furthermore, the greatest challenge for direct alcohol fuel cell is fuel crossover from the anode to the cathode, leading to cathode depolarization, decreasing overall fuel cell's voltage and lowering fuel efficiency. Fuel crossover is a greater problem with increasing fuel concentration. In order to reduce fuel crossover, generally, a fuel cell can use only very low concentration of fuel, for example, less than 1 M for a methanol fuel cell.

Therefore, the inventors have provided an improved fuel cell for generating hydrogen gas, electrical power and mediation of electrochemical reactions and reactant transport.

BRIEF SUMMARY OF THE INVENTION

Embodiments of the present invention relate to a fuel cell which may include an anode; a cathode opposing the anode; a first electrolyte membrane disposed between the anode and the cathode; a second electrolyte membrane disposed between the anode and the cathode; and an A/C junction electrode disposed between the first electrolyte membrane and the second electrolyte membrane, the A/C junction electrode comprising a first gas diffusion layer, a second gas diffusion layer, a current collector disposed between the first gas diffusion layer and the second gas diffusion layer, a first catalyst layer disposed between the first electrolyte membrane and the first gas diffusion layer, and a second catalyst layer disposed between the second electrolyte membrane and the second gas diffusion layer.

In some embodiments, a method of generating electric power may include (a) supplying air and fuel to a fuel cell comprising (i) an anode, (ii) a cathode, (iii) a first electrolyte membrane disposed between the anode and the cathode, (iv) a second electrolyte membrane disposed between the anode and the cathode, and (v) an A/C junction electrode disposed between the first electrolyte membrane and the second electrolyte membrane, the A/C junction electrode comprising (1) a first gas diffusion layer, (2) a second gas diffusion layer, (3) a first current collector disposed between the first gas diffusion layer and the second gas diffusion layer, (4) a first catalyst layer disposed between the first electrolyte membrane and the first gas diffusion layer, and (5) a second catalyst layer disposed between the second electrolyte membrane and the second gas diffusion layer, wherein the fuel is supplied to the anode and the air is supplied to the cathode; and (b) supplying a first voltage to the fuel cell to process the fuel into hydrogen.

Other and further embodiments of the invention are described in more detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Embodiments of the present invention include an anode/cathode (A/C) junction fuel cell. The fuel cell in accordance with some embodiments of the present invention advantageously functions as a hydrogen/air fuel cell using hydrogen to generate electricity from an alcohol fuel. In some embodiments, the fuel cell in accordance with some embodiments of the present invention advantageously functions as an alcohol/air fuel cell.

Figure 1:
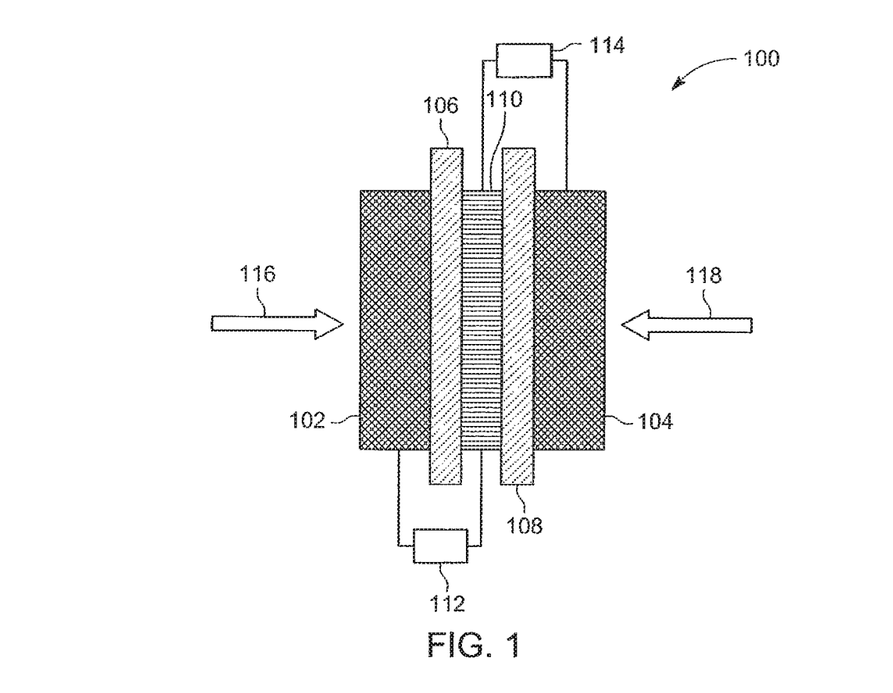
FIG. 1 depicts a schematic view of a fuel cell in accordance with some embodiments of the present invention.

FIG. 1 depicts a schematic view of a fuel cell 100 in accordance with some embodiments of the present invention. The fuel cell 100 comprises an anode 102 and a cathode 104 opposing the anode 102. The fuel 116 is provided to the anode 102 side of the fuel cell 100 and an oxidizing gas 118, such as air, is provided to the cathode 104 side of the fuel cell 100.

A first electrolyte membrane 106 and a second electrolyte membrane 108 are disposed between the anode 102 and the cathode 104. In some embodiments, the first electrolyte membrane 106 and the second electrolyte membrane 108 can be an acidic membrane, for example, a perfluorosulfonic acid membrane, such as Nafion® (Du Pont), or XUS® membrane (Dow Chemical), or the like. In some embodiments, the first electrolyte membrane 106 and the second electrolyte membrane 108 can be an alkaline membrane, composed of, for example, a Tokuyama A201 membrane, or the like. In some embodiments, the first electrolyte membrane 106 and the second electrolyte membrane 108 are composed of Nafion 117. The first and second electrolyte membranes 106, 108 provide ionic conductivity for ion transport and induce electrochemical reactions at the electrode/electrolyte interface.

Figure 2:
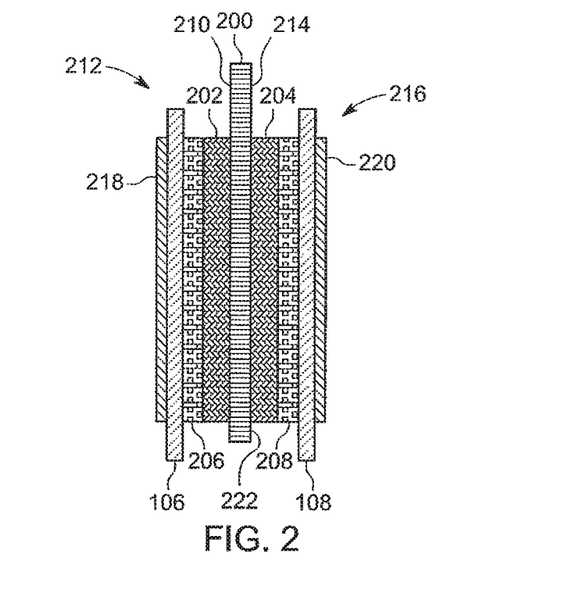
FIG. 2 depicts a cross-sectional view of an A/C junction electrode as positioned between a first electrolyte membrane and a second electrolyte membrane in accordance with some embodiments of the present invention.

An A/C junction electrode 110 is disposed between the first electrolyte membrane 106 and the second electrolyte membrane 108. FIG. 2 depicts a cross-sectional view of the A/C junction electrode 110 as positioned between the first electrolyte membrane 106 and the second electrolyte membrane 108 in accordance with some embodiments of the present invention. The A/C junction electrode 110 comprises a first gas diffusion layer 202, a second gas diffusion layer 204, an A/C junction electrode current collector 200, a first catalyst layer 206 and a second catalyst layer 208.

The A/C junction electrode current collector 200 is disposed between the first gas diffusion layer 202 and the second gas diffusion layer 204. In some embodiments, the A/C junction electrode current collector 200 is composed of, for example, graphite, titanium, or other inert metals. In some embodiments, the A/C junction electrode current collector is a titanium sheet having a thickness of about 0.5 mm. The A/C junction electrode current collector 200 comprises a cathodic surface 210 (i.e. an anode facing surface) and an anodic surface 214 (i.e. a cathode facing surface). The cathodic surface 210 provides the potential to reduce protons to hydrogen at the catalyst/electrolyte interface. The anodic surface provides the potential to oxidize hydrogen or fuel at the catalyst/electrolyte interface. In some embodiments, the current collector may have any suitable area, for example an area of about 1 $cm^2$ to about 25 $cm^2$. The A/C junction electrode current collector 200 has a plurality of pores 222. In some embodiments, the A/C junction electrode current collector 200 comprises a plurality of large pores, for example about 1.4 mm to about 3.4 mm in diameter and a plurality of small pores, for example about 0.5 mm to about 1.4 mm in diameter. In some embodiments, the A/C junction electrode current collector 200 has an area of about 9 $cm^2$, where the large pores have a diameter of about 3.4 mm and the small pores have a diameter of about 1.4 mm resulting in a total pore area of about 3.65 $cm^2$ and a total non-pore area of about 5.35 $cm^2$.

The first gas diffusion layer 202 and the second gas diffusion layer 204 are hydrophobic to allow permeation of gas while limiting the permeation of water. In some embodiments, the first gas diffusion layer 202 and the second gas diffusion layer 204 comprise Teflon treated carbon cloth, or carbon paper, or a porous metal layer, such as nickel foam, or titanium foam with a Teflon content of about 20% to about 40%. In some embodiments, the first gas diffusion layer 202 and the second gas diffusion layer 204 have a thickness of about 0.1 to about 0.6 mm, for example about 0.3 mm.

The first catalyst layer 206 is disposed between the first electrolyte membrane 106 and the first gas diffusion layer 202. The first catalyst layer 206 is a cathode catalyst. In some embodiments, the cathode catalyst is composed of, for example, platinum black, or a platinum-cobalt (PtCo) alloy, or platinum supported on carbon black (PtC). In some embodiments, the cathode catalyst is used for cathodic reactions such as oxygen reduction at the cathode 104 or proton reduction at the A/C junction electrode 110. In some embodiments, the cathode catalyst is formed using a mixture of 90 weight % platinum black and 10 weight % dry Nafion and coated onto a 0.2 mm carbon cloth and dried at 80 degrees Celsius.

The second catalyst layer 208 is disposed between the second electrolyte membrane 108 and the second gas diffusion layer 204. In some embodiments, the second catalyst layer 208 is an anode catalyst. In some embodiments, the anode catalyst is, for example, platinum-ruthenium (PtRu), or platinum-tin (PtSn), or platinum-molybdenum (PtMo). In some embodiments, the anode catalyst is used for anodic reactions such as fuel oxidation at the anode 102 or hydrogen oxidation at the A/C junction electrode 110. In some embodiments, the anode catalyst is formed using a mixture of 85 weight % platinum-ruthenium and 15 weight % dry Nafion coated onto a 0.2 mm carbon cloth and dried at 80 degrees Celsius.

A third catalyst layer 220 is disposed adjacent the second electrolyte membrane 108 and opposite the second catalyst layer 208. The third catalyst layer 220 is a cathode catalyst supporting oxygen reduction at the cathode 104. A fourth catalyst layer 218 is disposed adjacent the first electrolyte membrane 106 and opposite the first catalyst layer 206. The fourth catalyst layer 218 is an anode catalyst supporting fuel oxidation at the anode 102.

The anode 102, the fourth catalyst layer 218, the first electrolyte membrane 106, the first catalyst layer 206, the first gas diffusion layer 202, and the cathodic surface 210 of the A/C junction electrode current collector 200 form a first unit 212. In some embodiments, the first unit 212 processes fuel 116 supplied to the fuel cell 100 into hydrogen. In some embodiments, the first unit 212 controls fuel transport to the second unit 216 described below, without processing fuel 116 supplied to the fuel cell 100. Controlling fuel transport from the first unit 212 to the second unit 216 avoids cathode depolarization which can decrease overall fuel cell voltage and lower fuel efficiency.

In some embodiments, as depicted in FIG. 1, an input voltage 112 is supplied to the first unit 212 to convert the fuel 116 into hydrogen gas. In some embodiments, the input voltage 112 is supplied by an external power source with the positive electrode coupled to the anode 102 and the negative electrode coupled to the A/C junction electrode 110.

As fuel 116 is supplied to the anode 102 side of the fuel cell 100, an anodic reaction occurs at the anode 102 and a cathodic reaction occurs at the interface between the first electrolyte membrane 106 and the first catalyst layer 206. In some embodiments, the fuel 116 is, for example, a methanol ($CH_3OH$) water mixture, or ethanol, or rubbing alcohol (2-propanol), ethylene glycol, or the like. In embodiments where the fuel 116 is a methanol-water mixture, the mixture comprises about 4 vol. percent to about 40 vol. percent methanol and the balance water. In embodiments where the fuel 116 is a methanol-water mixture, the fuel is oxidized at the anode 102 to release protons and electrons according to the following formula: $CH_3OH+H_2O=CO_2+6H^++6e^-$. The protons migrate through the first electrolytic membrane 106 to the first catalyst layer 206 and recombine with the electrons to produce hydrogen gas according to the following formula: $6H^++6e^-\rightarrow 3H_2$. The hydrogen generated is further transported to the second catalyst layer 208.

The cathode 104, the third catalyst layer 220, the second electrolyte membrane 108, the second catalyst layer 208, the second gas diffusion layer 204, and the anodic surface 214 of the A/C junction electrode current collector 200 form a second unit 216. In some embodiments, the second unit 216 generates an output voltage 114 using the hydrogen created in the first unit 212. In some embodiments, the input voltage 112 supplied to the first unit 212 from the power source is less than the output voltage 114 generated by the second unit 216. In some embodiments, the anodic reaction occurs at the interface between the second catalyst layer 208 and the second electrolyte membrane 108 and the cathodic reaction occurs at the cathode 104. The anodic reaction is $3H_2 \rightarrow 6H^++6e^-$ and the cathodic reaction is $O_2+6H^++6e^- \rightarrow 3H_2O$.

Figure 3:
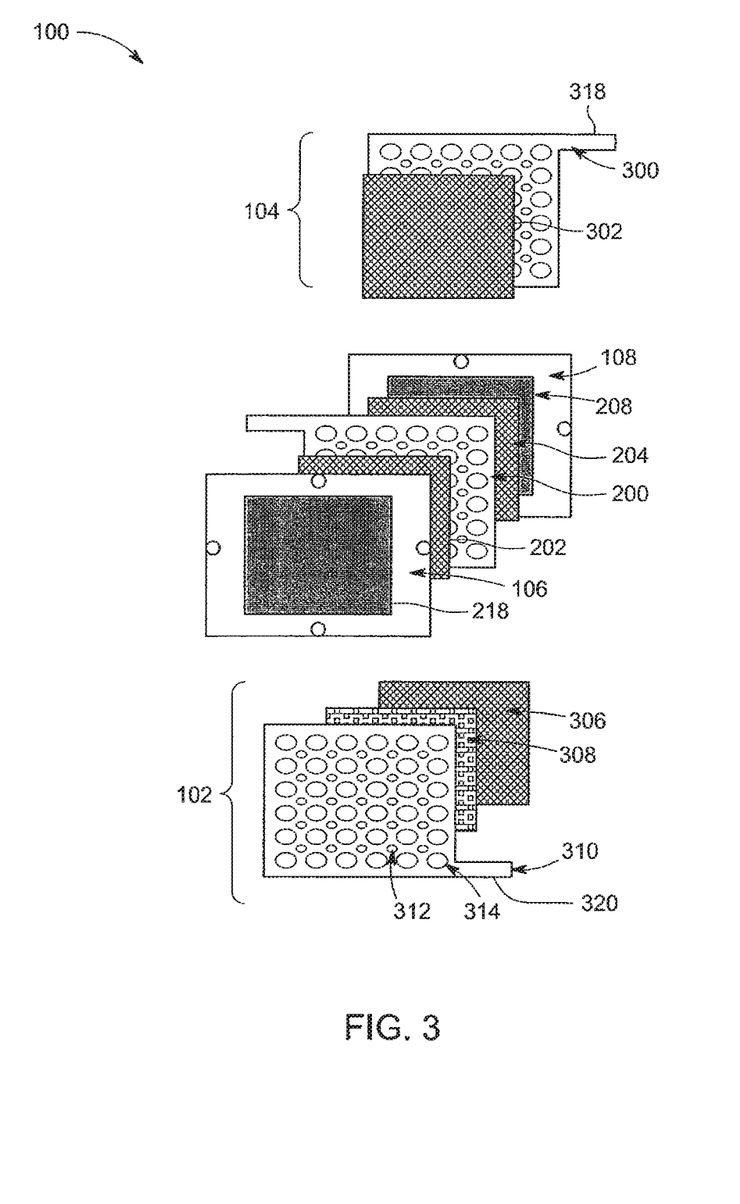
FIG. 3 depicts an exploded view of electrodes and components for a fuel cell in accordance with some embodiments of the present invention.

FIG. 3 depicts an exploded view of the components of a fuel cell 100 in accordance with some embodiments of the present invention. FIG. 3 depicts the anode 102 and the cathode 104. FIG. 3 also depicts the components of the A/C junction electrode 110 (i.e. the first gas diffusion layer 202, the A/C junction electrode current collector 200, the second gas diffusion layer 204, and the second catalyst layer 208) as positioned between the first electrolyte membrane 106 and the second electrolyte membrane 108. As depicted in FIG. 3, the anode 102 comprises an anode current collector 310, a first anode gas diffusion layer 306, and a second anode gas diffusion layer 308. The anode current collector 310 comprises an anode electrode lead 320. The second anode gas diffusion layer 308 is disposed between the anode current collector 310 and the first anode gas diffusion layer 306. The first anode gas diffusion layer 306 is disposed adjacent the first electrolyte membrane 106.

In some embodiments, the anode current collector 310 comprises a material such as a titanium sheet, or a graphite sheet. In some embodiments, the anode current collector 310 may have the same area as described above for the A/C junction electrode current collector 200 and may comprise a plurality of large pores 314 and a plurality of small pores 312 as described above for the A/C junction electrode current collector 200.

The first anode gas diffusion layer 306 is hydrophobic to allow permeation of gas while limiting the permeation of water. In some embodiments, the first anode gas diffusion layer 306 is made of material such as Teflon treated carbon cloth, or carbon paper, or a porous metal layer, such as nickel foam, or titanium foam with a Teflon content of about 20% to about 40%. The second anode gas diffusion layer 308 is hydrophilic to allow permeation of water or fuel without limiting, or substantially limiting, the permeation of water. In some embodiments, the second anode gas diffusion layer 308 is made of a material such as carbon cloth, or carbon paper with a lower Teflon content (for example, about 2% to about 10%).

As depicted in FIG. 3, the cathode 104 comprises a cathode current collector 300, and a cathode gas diffusion layer 302. The cathode current collector 300 comprises a cathode electrode lead 318. In some embodiments, the cathode current collector 300 may have the same area as described above for the A/C junction electrode current collector 200 and may comprise a plurality of large pores and a plurality of small pores as described above for the A/C junction electrode current collector 200. The cathode gas diffusion layer 302 is disposed between the cathode current collector 300 and the second electrolyte membrane 108. The cathode gas diffusion layer 302 is hydrophobic to allow permeation of gas while limiting, or substantially limiting the permeation of water. In some embodiments, the cathode gas diffusion layer 302 may be made of the same material and may be of the same thickness as described above for the first and second gas diffusion layers 202, 204.

Figure 4:
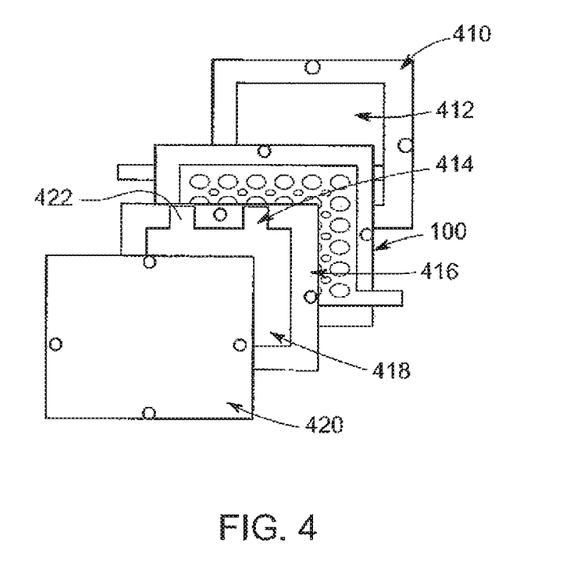
FIG. 4 depicts an exploded view of a single fuel cell with one A/C junction electrode in accordance with some embodiments of the present invention.

FIG. 4 depicts an exploded view of a single fuel cell 100 with one A/C junction electrode in accordance with some embodiments of the present invention. In some embodiments, a fuel chamber 416 is coupled to the anode side of the fuel cell 100 to supply fuel to the fuel cell 100. An anode end-plate 420 is coupled to the fuel chamber 416. The anode end plate 420 is coupled to the fuel chamber 416 to define the first volume 418. The first volume 418 stores a liquid fuel. A fuel inlet 414 is fluidly coupled to the first volume 418 to supply a liquid fuel to the first volume 418. A gas outlet 422 is fluidly coupled to the first volume 418 to allow the release of gas build-up from the first volume 418. In some embodiments, the fuel chamber 416 and anode end plate 420 coupled thereto may be in the form of a singular unit defining the first volume 418, as opposed to two separate components as illustrated. A cathode end plate 410 having a second volume 412 is coupled to the cathode side of the fuel cell 100. The second volume 412 in the cathode end plate 410 supplies air via convection to the fuel cell 100. In some embodiments, the fuel chamber 416, the anode end plate 420, and the cathode end plate 410 are made with organic glass. In some embodiments, a gasket, made for example from Teflon®, is used as a seal between the fuel chamber 416, the anode end plate 420, and the cathode end plate 410.

Figure 5:
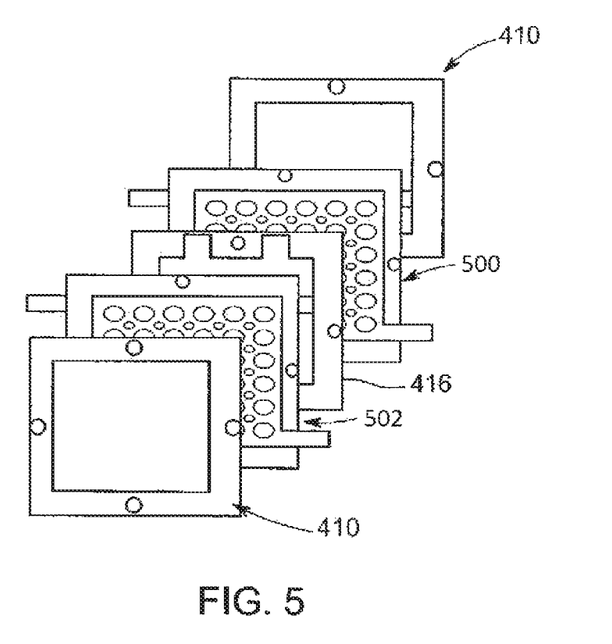
FIG. 5 depicts an exploded view of a double A/C junction fuel cell in accordance with some embodiments of the present invention.

In some embodiments, as depicted in FIG. 5, multiple fuel cells can be coupled together to advantageously provide increased power output. As depicted in FIG. 5, the anode side of a first fuel cell 500, as described above, is coupled to a first side of a fuel chamber 416 and the anode side of a second fuel cell 502 is coupled to an opposing second side of the fuel chamber 416. A cathode end plate 410 is coupled to the cathode side of the first fuel cell 500 and to the cathode side of the second fuel cell 502.

Figure 6:
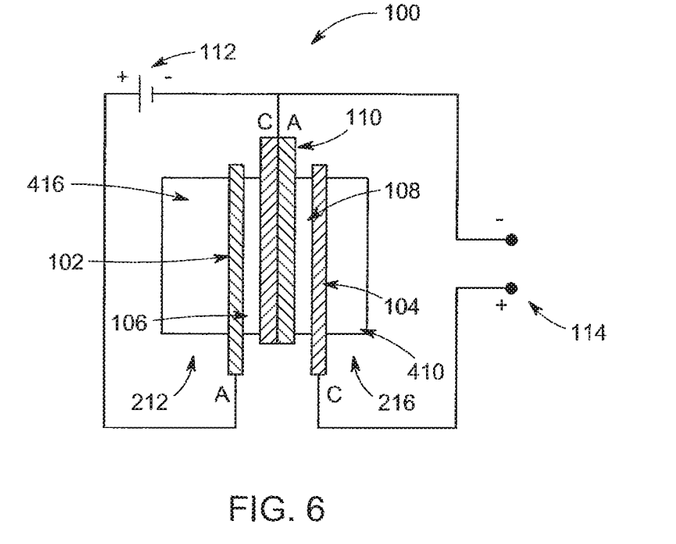
FIG. 6 depicts an exemplary electrical connection of a single A/C junction fuel cell in accordance with some embodiments of the present invention.

As described above, a power source is coupled to the first unit 212 to provide an input voltage 112 to convert the fuel 116 into hydrogen, which is used by the second unit 216 to generate an output voltage. FIG. 6 depicts an exemplary electrical connection of a fuel cell 100 in accordance with some embodiments of the present invention. As depicted in FIG. 6, an input voltage 112 is coupled to the anode 102 of the first unit 212 and is used to electrolyze water in the presence of fuel for generation of hydrogen. An output voltage 114 is generated by the second unit 216 using hydrogen created in the first unit 212. In some embodiments, the output voltage 114, referred to below as $U_2$, is greater than the input voltage 112, referred to below as $U_1$. The net voltage output ($U_{net}$) is $$U_{net} = U_2 - U_1$$

The net power output $P_{net}$ is:

$$P_{net} = U_2 I_2 - U_1 I_1$$

The net output energy density ($E_{net}$ in Wh/Kg) is:

$$E_{net} = \frac{1}{3600 \cdot W} \int_{t_1}^{t_2} (U_2 I_2 - U_1 I_1) dt$$

Here, W is the fuel mass in Kg, $t_i$, is time in seconds. The current conversion efficiency, or coulomb efficiency, C %, from the fuel processing unit to the fuel cell unit is $$C \% = \frac{C_2}{C_1} \times 100\%$$

$$C_i = \frac{1}{3600} \int_{t_1}^{t_2} I_i dt$$

Here, $C_1$ and $C_2$ are charge capacity and discharge capacity, respectively. The capacity can be obtained by integration from the time period of $t_1$ to $t_2$. If current conversion efficiency is 100, $I_1$ is equal to $I_2$ by constant voltage operation, the net power output is:

$$P_{net} = (U_2 - U_1) I$$

Figure 7:
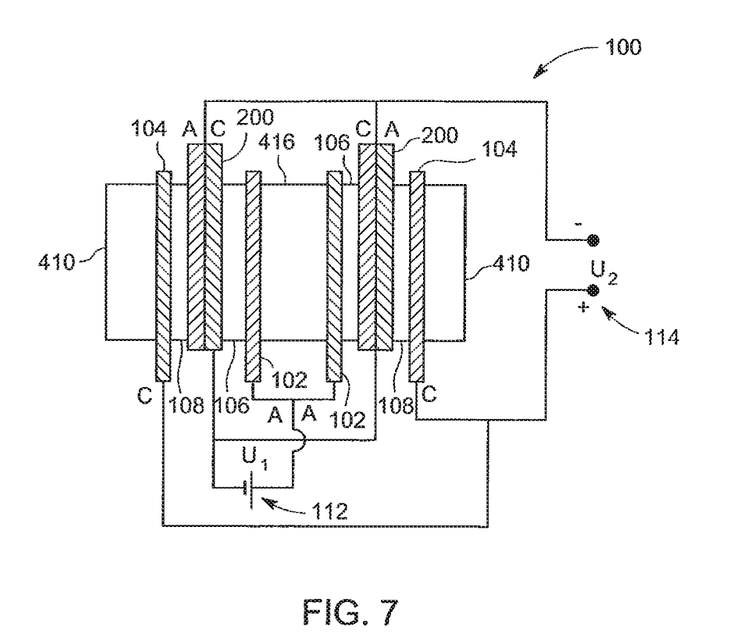
FIG. 7 depicts an exemplary electrical connection of a double A/C junction fuel cell where the fuel cell is electrically connected in parallel.
Figure 8:
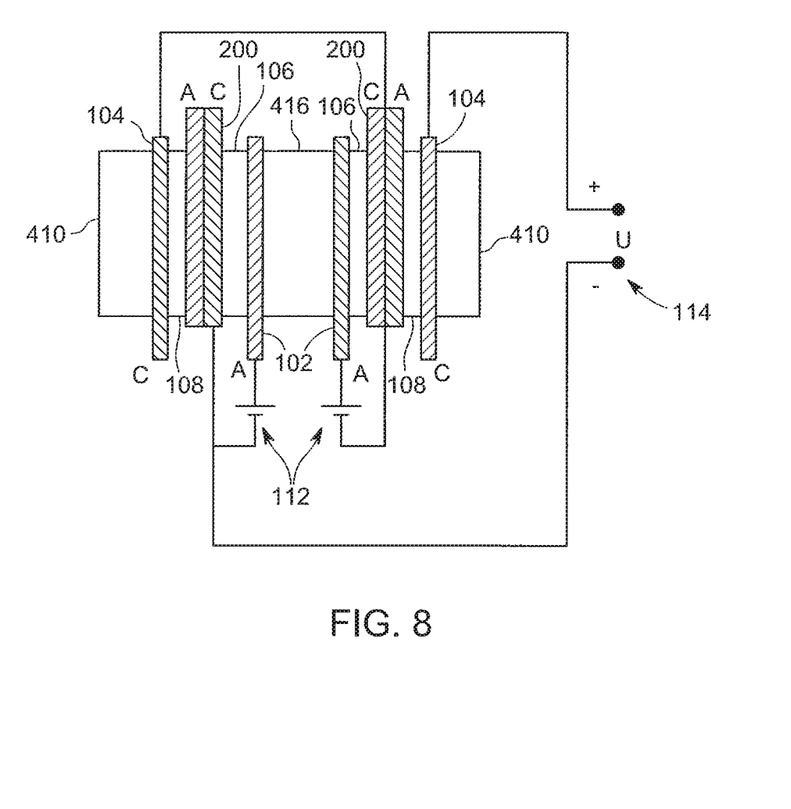
FIG. 8 depicts an exemplary electrical connection of a double A/C junction electrode fuel cell where the fuel cell is electrically connected in series.

FIG. 7 depicts an exemplary electrical connection of a double A/C junction electrode fuel cell 100 where the fuel cell 100 is electrically connected in parallel. Electrically connecting the fuel cell in parallel provides a higher current output than connecting the fuel cell in series. The current output of a fuel cell connected in parallel is (n×I), where n is the number of fuel cells and I is the current of each of the identical fuel cells. FIG. 8 depicts an exemplary electrical connection of a double A/C junction electrode fuel cell 100 where the fuel cell 100 is electrically connected in series. Electrically connecting the fuel cell 100 in series provides a higher voltage output than connecting the fuel cell in parallel. The voltage output of fuel cell connected in series is (n×E), where n is the cell number and E is the voltage of each of the identical cells.

An electrochemical evaluation was carried out of a fuel cell having a cathode catalyst formed using a mixture of 90 weight % platinum black and 10 weight % dry Nafion and coated onto a 0.2 mm carbon cloth and dried at 80 degrees Celsius and an anode catalyst formed using a mixture of 85 weight % platinum-ruthenium and 15 weight % dry Nafion coated onto a 0.2 mm carbon cloth and dried at 80 degrees Celsius.

Figure 9A:
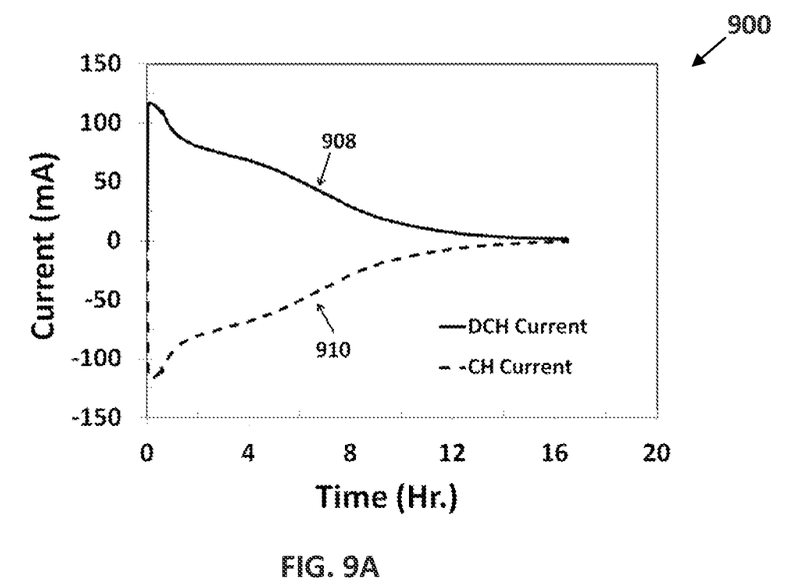
FIGS. 9A-9B depict the performance of a fuel cell in accordance with some embodiments of the present invention.
Figure 9B:
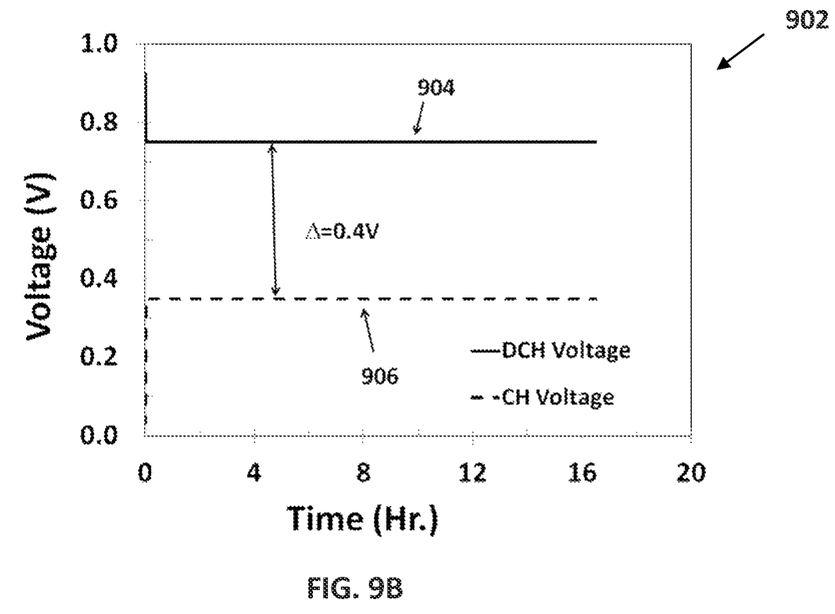
Figure 10:
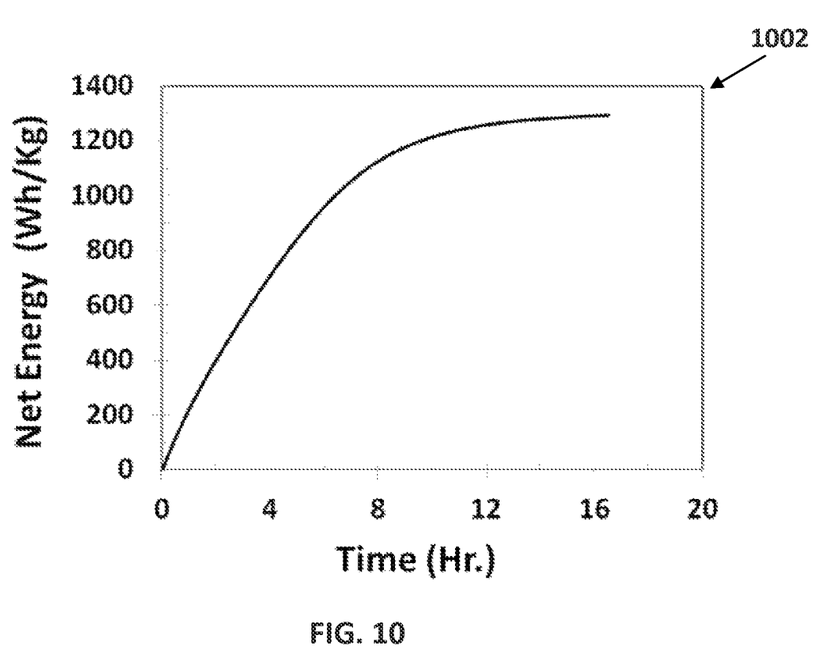
FIG. 10 depicts the performance of a fuel cell in accordance with some embodiments of the present invention.

FIGS. 9A-9B depict the performance of a fuel cell in accordance with some embodiments of the present invention. In the embodiment depicted in FIGS. 9A-9B, 6 ml of 1.0M (4 vol. percent) methanol was filled into the fuel chamber. As depicted in graph 902 of FIG. 9B, input voltage 906 was supplied at a constant 0.35V, resulting in an output voltage 904 at a constant 0.75V. In this example, the methanol fuel was first processed into hydrogen in the first unit 212 (fuel processing unit). Meanwhile, the hydrogen was used in the second unit 216 (fuel cell unit), and generated an electric power output having a net output voltage of 0.4V. The discharge current is defined as positive current, and the charge current is defined as negative current. As depicted in graph 900 of FIG. 9A, the charge current 910 is equal to the discharge current 908, or 100% coulomb efficiency from the first unit 212 (fuel processing unit) to the second unit 216 (fuel cell unit) of the fuel cell 100. FIG. 10 is a graph 1002 showing that the energy density obtained from this fuel cell reaches 1,300 Wh/Kg at the completion of the fuel in the fuel chamber.

Figure 11A:
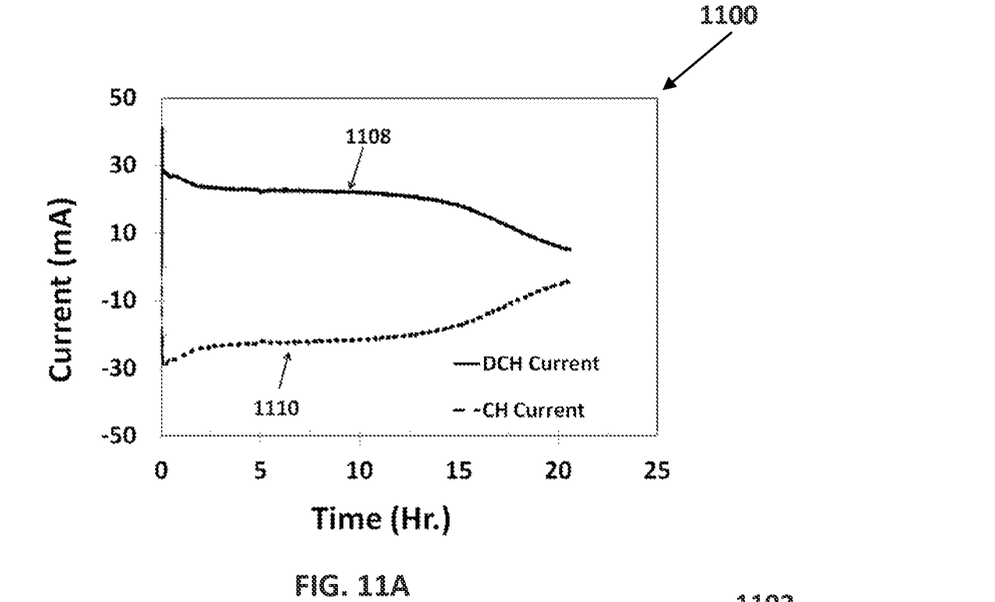
FIGS. 11A-11B depict the performance of a fuel cell in accordance with some embodiments of the present invention.
Figure 11B:
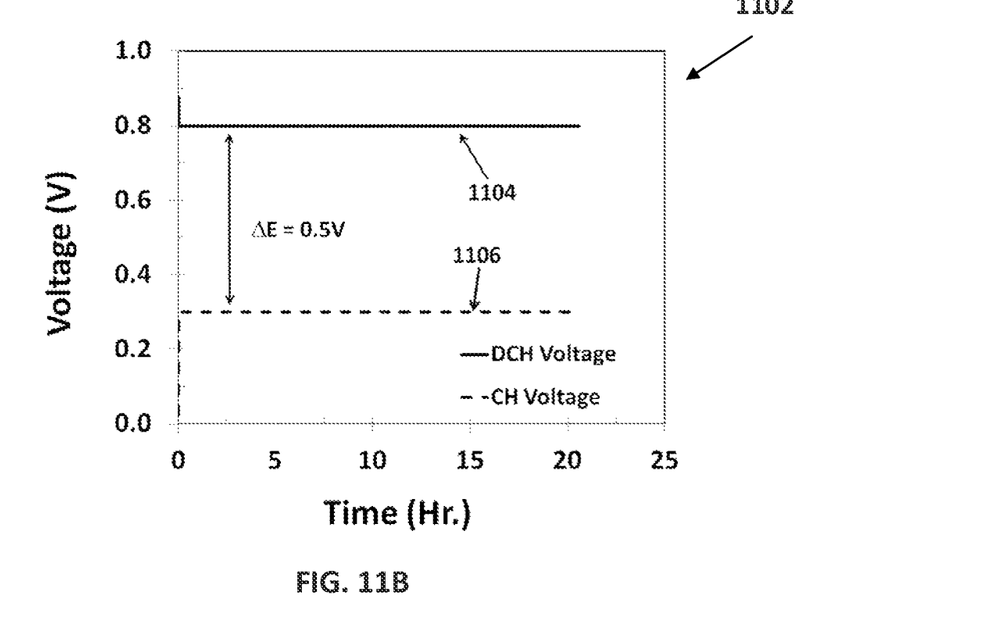

FIGS. 11A-11B depict the performance of a fuel cell in accordance with some embodiments of the present invention. In the embodiment depicted in FIGS. 11A-11B, 6 ml of 1.0M methanol was filled into the fuel chamber. As depicted in graph 1102 of FIG. 11B, the input voltage 1106 was supplied at a constant 0.30V resulting in an output voltage 1104 at a constant 0.80V. In this example, the methanol was first processed into hydrogen in the first unit 212. Meanwhile, the hydrogen was used in the second unit 216, and generated electric power output with a higher net output voltage of 0.5V. As depicted in graph 1100 of FIG. 11A, the charge current 1110 is equal to the discharge current 1108, or 100% coulomb efficiency, from the first unit 212 to the second unit 216 of the fuel cell 100.

Figure 12A:
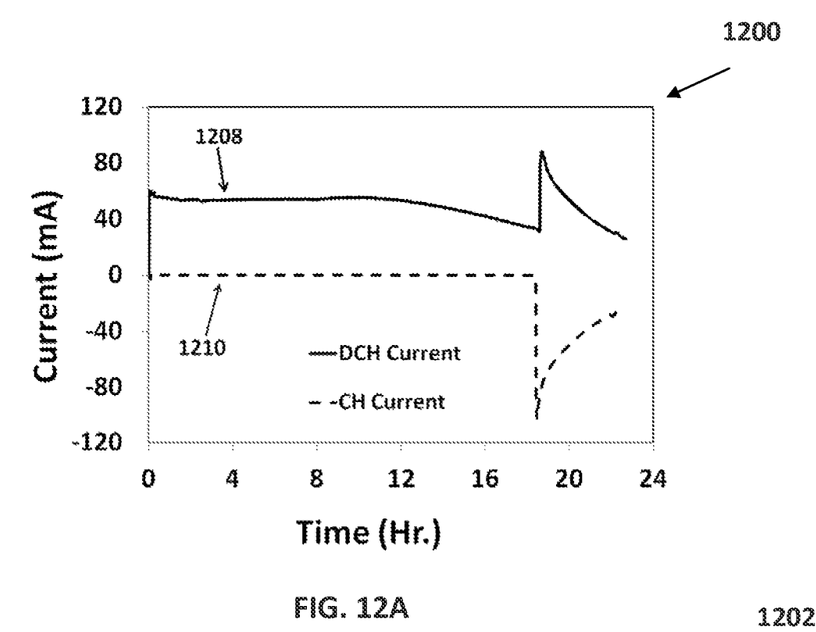
FIGS. 12A-12B depict the performance of a fuel cell in accordance with some embodiments of the present invention.
Figure 12B:
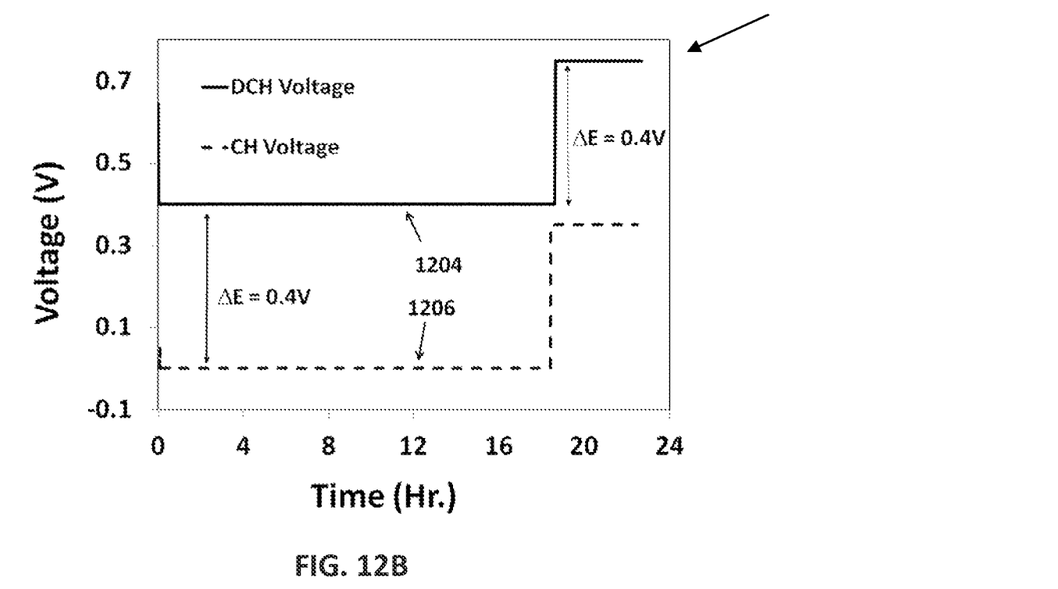

FIGS. 12A-12B depict the performance of a fuel cell in accordance with some embodiments of the present invention. In the embodiment depicted in FIGS. 12A-12B, 6 ml of 4.0M methanol was filled into the fuel chamber. As depicted in graph 1202 of FIG. 12B, an input voltage 1206 at a constant 0.00V was supplied for a first period of time from about 0 hours to about 18 hours. No fuel processing occurred during this first period of time. The output voltage 1204 during the first period of time was constant at 0.40V. The net voltage output was 0.40V. The input voltage 1206 was then increased to a constant 0.35V for a second period of time from about 18 hours to about 23 hours resulting in an output voltage 1204 that was constant at 0.75V. The net output voltage was still 0.4V. During the first period of time, the methanol fuel was directly transported, without processing into hydrogen, into the second unit 216 to generate electric power. In this embodiment, the A/C junction electrode functioned as a fuel mediator to transport fuel slowly to the second unit 216. During the second period of time, the methanol fuel was first processed into hydrogen and then transported to the second unit 216 to generate electric power. As depicted in graph 1200 of FIG. 12A, during the second period of time, the charge current 1210 is substantially equal to the discharge current 1208, or 99% coulomb efficiency, from the first unit 212 to the second unit 216 of the fuel cell 100.

Figure 13A:
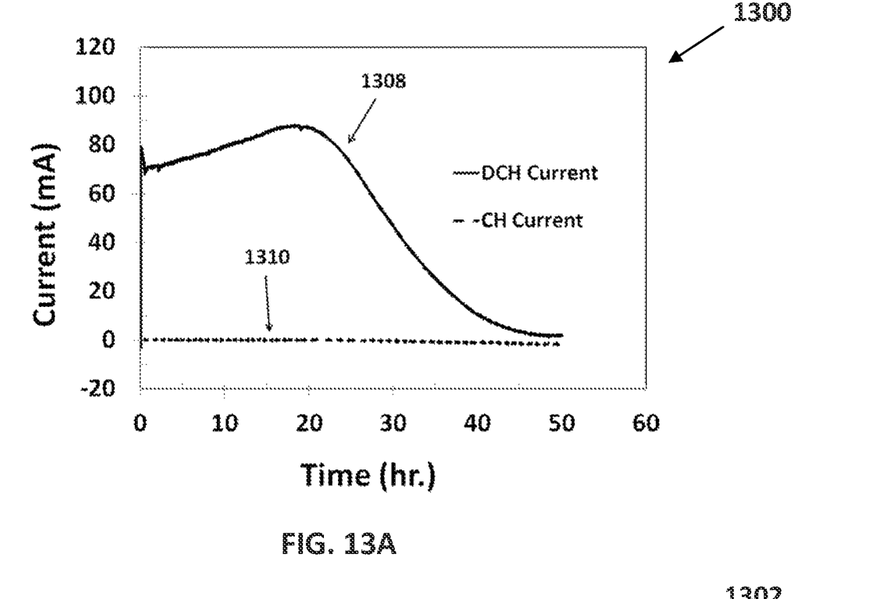
FIGS. 13A-13B depict the performance of a fuel cell in accordance with some embodiments of the present invention.
Figure 13B:
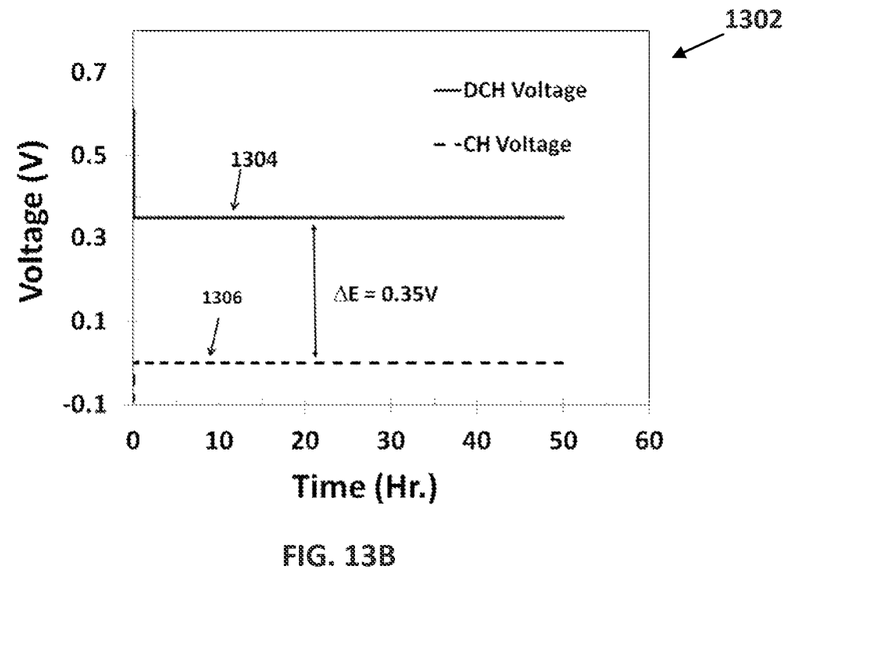

FIGS. 13A-13B depict the performance of a fuel cell in accordance with some embodiments of the present invention. In the embodiment depicted in FIGS. 13A-13B, 6 ml of 10.0M methanol was filled into the fuel chamber. As depicted in graph 1302 of FIG. 13B, input voltage 1306 was supplied at a constant 0.00V, resulting in no fuel processing occurring. The resulting output voltage 1304 was constant at 0.35V. The net voltage output was 0.35V. As depicted in graph 1300 of FIG. 13A, the discharge current 1308 fluctuates over time while the charge current 1310 is constant at zero. In this embodiment, the methanol fuel was directly transported, without processing into hydrogen, into the second unit 216 to generate electric power. In this embodiment, the A/C junction electrode functioned as a fuel mediator to slowly transport fuel to the second unit 216.

While the foregoing is directed to embodiments of the present invention, other and further embodiments of the invention may be devised without departing from the basic scope thereof.

The invention claimed is:

1. An electrochemical device comprising:
a first and a second electrochemical cell;
wherein the first electrochemical cell is a fuel processing cell and the second electro chemical cell is a fuel cell;
further wherein the fuel processing cell further comprises an anode and one face of an A/C junction electrode;
further wherein the fuel cell comprises a cathode comprising an opposite face of the A/C junction electrode and wherein the A/C junction electrode separates the fuel processing cell and the fuel cell;
further comprising;
a first electrolyte membrane disposed between the anode and one face of the A/C junction electrode;
a second electrolyte membrane disposed between the anode and the opposite face of the A/C junction electrode;
wherein the anode comprises an anode current collector, a first anode gas diffusion layer, and a second anode gas diffusion layer disposed between the anode current collector and the first anode gas diffusion layer, wherein the first anode gas diffusion layer is disposed adjacent the first electrolyte membrane; and
an A/C junction electrode disposed between the first electrolyte membrane and the second electrolyte membrane, the A/C junction electrode comprising:
a first gas diffusion layer;
a second gas diffusion layer;
a current collector disposed between the first gas diffusion layer and the second gas diffusion layer comprising a plurality of large pores having a diameter of 3.4 mm and a plurality of small pores having a diameter of 1.4 mm allowing fuel transfer from a fuel chamber into the fuel processing cell;
a first catalyst layer disposed between the first electrolyte membrane and the first gas diffusion layer; and
a second catalyst layer disposed between the second electrolyte membrane and the second gas diffusion layer.

2. The fuel cell of claim 1, wherein the cathode comprises a cathode gas diffusion layer and a cathode current collector, wherein the cathode gas diffusion layer is disposed between the cathode current collector and the second electrolyte membrane and allows oxygen transfer into the fuel cell through the pores.

3. The fuel cell of claim 2, further comprising
a fuel chamber coupled to the anode;
an anode end plate coupled to the fuel chamber, wherein the anode end plate and the fuel chamber define a first volume configured to provide a fuel to the anode; and
a cathode end plate coupled to the cathode and having a second volume configured to provide air to the cathode.

4. The fuel cell of claim 3, wherein the fuel is a mixture of methanol (CH3OH) and water.

5. The fuel cell of claim 4, wherein the mixture comprises between about 4 volumetric percent to about 40 volumetric percent methanol and the balance water.

6. The fuel cell of claim 1, wherein the current collector is an inert metal.

7. The fuel cell of claim 1, wherein the gas diffusion layers are hydrophobic and wherein the first gas diffusion layer has a Teflon content of about 20% to about 40% and a thickness of about 0.1 to about 0.6 mm and the second gas diffusion layer has a Teflon content of about 2% to about 10% and a thickness of about 0.1 to about 0.6 mm.

8. The fuel cell of claim 1, wherein the first electrolyte membrane and the second electrolyte membrane are both one of an acidic membrane or an alkaline membrane.

9. The fuel cell of claim 1, further comprising a fourth catalyst layer disposed adjacent the first electrolyte membrane and opposite the first catalyst layer, wherein the anode, the fourth catalyst layer, the first electrolyte membrane, the first catalyst layer, the first gas diffusion layer, and a cathodic surface of the A/C junction electrode current collector form a first unit configured to process fuel into hydrogen.

10. The fuel cell of claim 9, further comprising a third catalyst layer disposed adjacent the second electrolyte membrane and opposite the second catalyst layer, wherein the cathode, the third catalyst layer, the second electrolyte membrane, the second catalyst layer, the second gas diffusion layer, and an anodic surface of the A/C junction electrode current collector form a second unit configured to generate an output voltage from the hydrogen created in the first unit and wherein no hydrogen is accumulated in the first or the second unit.

11. The fuel cell of claim 10, further comprising a power source coupled to the first unit to provide an input voltage when processing fuel into hydrogen, wherein the input voltage is less than the output voltage from the second unit.

12. A method of generating electric power, comprising;
(a) supplying air and fuel to a fuel cell comprising:
(i) an anode comprising an anode current collector, a first anode gas diffusion layer, and a second anode gas diffusion layer disposed between the anode current collector and the first anode gas diffusion layer, wherein the first anode gas diffusion layer is disposed adjacent a first electrolyte membrane;
(ii) a cathode;
(iii) the first electrolyte membrane disposed between the anode and the cathode;
(iv) a second electrolyte membrane disposed between the anode and the cathode; and (v) an A/C junction electrode disposed between the first electrolyte membrane and the second electrolyte membrane, the A/C junction electrode comprising:
  (1) a first gas diffusion layer;
  (2) a second gas diffusion layer;
  (3) a first current collector disposed between the first gas diffusion layer and the second gas diffusion layer comprising a plurality of large pores having a diameter of 3.4 mm and a plurality of small pores having a diameter of 1.4 mm allowing fuel transfer from a fuel chamber into the fuel processing cell;
  (4) a first catalyst layer disposed between the first electrolyte membrane and the first gas diffusion layer; and
  (5) a second catalyst layer disposed between the second electrolyte membrane and the second gas diffusion layer; wherein the fuel is supplied to the anode and the air is supplied to the cathode; and
(b) supplying a first voltage to the fuel cell to process the fuel into hydrogen.

13. The method of claim 12, wherein the cathode comprises a cathode gas diffusion layer and a cathode current collector, wherein the cathode gas diffusion layer is disposed between the cathode current collector and the second electrolyte membrane.

14. The method of claim 12, wherein the fuel cell further comprises
a fuel chamber coupled to the anode;
an anode end plate coupled to the fuel chamber, wherein the anode end plate and the fuel chamber define a first volume configured to provide a fuel to the anode; and
a cathode end plate coupled to the cathode and having a second volume configured to provide air to the cathode.

15. The method of claim 12, wherein the fuel is a mixture of methanol (CH3OH) and water.

16. The method of claim 15, wherein the mixture comprises between about 4 volumetric percent to about 40 volumetric percent methanol and the balance water.

17. The method of claim 12, wherein the fuel cell further comprises:
a fourth catalyst layer disposed adjacent the first electrolyte membrane and opposite the first catalyst layer, wherein the anode, the fourth catalyst layer, the first electrolyte membrane, the first catalyst layer, the first gas diffusion layer, and a cathodic surface of the A/C junction electrode current collector form a first unit configured to process fuel into hydrogen; and
a third catalyst layer disposed adjacent the second electrolyte membrane and opposite the second catalyst layer, wherein the cathode, the third catalyst layer, the second electrolyte membrane, the second catalyst layer, the second gas diffusion layer and an anodic surface of the A/C junction current collector form a second unit configured to generate an output voltage from the hydrogen created in the first unit.

18. The method of claim 17, wherein the A/C junction electrode controls the transport of fuel from the first unit to the second unit.

19. The method of claim 12, wherein the first voltage is about 0.2 V to about 0.4 V.

* * * * *